US005444209A

United States Patent [19]

Crawmer et al.

[11] Patent Number: 5,444,209

[45] Date of Patent: Aug. 22, 1995

[54] DIMENSIONALLY STABLE SUBSONIC PLASMA ARC SPRAY GUN WITH LONG WEARING ELECTRODES

[75] Inventors: Daryl E. Crawmer, Appleton, Wis.; Ray W. Selby, Irving, Tex.

[73] Assignee: Miller Thermal, Inc., Appleton, Wis.

[21] Appl. No.: 105,843

[22] Filed: Aug. 11, 1993

[51] Int. Cl.$^6$ .............................................. B23K 10/00

[52] U.S. Cl. .......................... 219/121.52; 219/121.48; 219/121.5; 219/121.49; 219/75; 219/121.47; 219/76.16

[58] Field of Search ............ 219/121.47, 76.16, 76.15, 219/121.59, 121.5, 75, 121.48, 121.52, 121.49; 313/231.21, 231.31

[56] References Cited

U.S. PATENT DOCUMENTS

| | | | |
|---|---|---|---|
| 3,075,065 | 1/1963 | Ducati et al. | 219/121.47 |
| 3,830,428 | 8/1974 | Dyos | 219/132.5 |
| 4,127,760 | 11/1978 | Meyer et al. | 219/121.47 |
| 4,140,892 | 2/1979 | Muller | 219/121.47 |
| 5,147,998 | 9/1992 | Tsantrizos et al. | 219/121.5 |
| 5,220,150 | 6/1993 | Pfender et al. | 219/121.51 |
| 5,225,625 | 7/1993 | Landes | 219/121.47 |

*Primary Examiner*—Mark H. Paschall
*Attorney, Agent, or Firm*—Donald Cayen

[57] ABSTRACT

An improved plasma arc spray gun performs with higher deposition efficiency and longer lasting anodes and cathodes than prior spray guns. The spray gun of the invention includes a housing made of a glass fiber reinforced TORLON material that remains dimensionally stable under all operating conditions. The anode of a relatively low velocity subsonic spray gun has an interior with five sections, two of which have cylindrical inner surfaces and three of which have frusto-conical surfaces. The cathode tip is carefully located within the anode interior such that the electrical arc between the anode and cathode attaches to the anode at a circular line at a junction of a cylindrical surface and a frusto-conical surface. Relatively high velocity subsonic versions of the plasma arc spray gun utilize anodes with three interior sections and streamlined passages for vortex stabilized flow of the primary gas. The primary gas flows in a vortex such that the point of attachment of the arc to the anode travels continuously along the circular line to reduce anode wear. The improved gas dynamics cools the cathode tip and thereby increases its service life.

22 Claims, 5 Drawing Sheets

DIMENSIONALLY STABLE SUBSONIC PLASMA ARC SPRAY GUN WITH LONG WEARING ELECTRODES

BACKGROUND OF THE INVENTION

1. Field of the Invention. This invention pertains to thermal spraying, and more particularly to improved guns for spraying metallic and ceramic particles onto a substrate.

2. Description of the Prior Art. Various equipment has been developed to coat a substrate made of a first material with a layer of a different material. Such equipment includes plasma arc spray guns, in which fine particulate matter is entrained in, heated, and accelerated by a plasma stream. The plasma stream is directed to the substrate such that the coating particles are deposited onto the substrate. Creation of the plasma stream is normally accomplished by an electric arc. The plasma stream may have subsonic or supersonic speeds. Typical examples of prior plasma arc spray guns may be seen in U.S. Pat. Nos. 3,740,522; 3,823,302; and 4,127,760.

A commercially available plasma arc spray gun is manufactured and marketed by Miller Thermal, Inc. of Appleton, Wis., under Model SG-100. In FIGS. 1 and 2, reference numeral 1 refers to a typical subsonic version of the Miller Thermal, Inc. Model SG-100 plasma arc spray gun. The plasma arc spray gun 1 includes a rear housing 3, a center housing 5, and a front housing 7. The rear housing 3, center housing 5, and front housing 7 are generally tubular in shape and have a common longitudinal axis 9. Suitable screws, not shown, connect the rear housing, center housing, and front housing together by means of longitudinally extending holes 11 in the center housing and cooperating threads, not shown, in the rear housing and counterbored holes, also not shown, in the front housing. A front cover 13 is attached to the front housing, as by screws, not shown, passing through counterbored holes 15 in the front cover 13.

Retained inside the rear housing 3 and the center housing 5 of the plasma arc spray gun 1 is a cathode holder 16, the back end of which is formed with a fitting 19. There is a groove 30 around the outer diameter of the cathode holder 16 that cooperates with an internal surface of the center housing to form a circumferential passage 31. The front end 23 of the cathode holder 16 is tapped to receive a cathode assembly 25. The cathode assembly 25 includes a tip 29 and a fitting section 106. There is a distinct step 104 between the outer surface 107 of the fitting section 106 and the adjacent outer surface 98 of the tip 29.

Located inside the center housing 5 and the front housing 7 of the plasma arc spray gun 1 is a tubular anode 33. The anode 33 has a longitudinal axis that is coaxial with the axis 9. The interior of the anode is divided into three sections. A front interior section 35 has a cylindrical inner surface 36. A middle interior section 37 has a frusto-conical surface 38 with a first included angle. A back interior section 39 has a frusto-conical inner surface 42 with a second included angle that is less than the first included angle. The tip 29 of the cathode assembly 25 is so dimensioned and located relative to the anode 33 that the tip end 40 is quite close to the junction 44 of the anode front and middle interior sections 35 and 37, respectively. Two radial holes 41 pass through the anode from the front interior section 35.

Sandwiched between the front end 23 of the cathode holder 16 and the back end 45 of the anode 33 is an injector ring 47. The outer diameter of the injector ring 47 cooperates with an internal surface of the center housing 5 to form an annular passage 53. Holes 55 through the injector ring lead between the annular passage 53 and an annular space 57 located between the inner diameter 59 of the injector ring and the outer surface 107 of the cathode assembly 25. The axial center lines of the holes 55 are usually generally tangential to the injector ring inner diameter 59. The diameter of the inner surface 42 of the back interior section 39 at the back end 45 of the anode 33 is larger than the inner diameter 59 of the injector ring 47. Consequently, a step 69 exists between the inner surface 42 of the anode and the inner diameter 59 of the injector ring.

A suitable hole not shown, in the rear housing 3 connects with a hole 58 in the center housing 5 and the annular passage 53. A fitting, not shown, is connected to the hole in the rear housing. The fitting is connected to a source of primary gas. Supplying the primary gas to the fitting causes the gas to flow into the annular passage 53, through the holes 55, and into the annular space 57. Because of the tangential nature of the holes 55 in the injector ring 47, the primary gas enters the annular space 57 with an angular velocity. From the annular space, the primary gas flows through the anode interior sections 39 and 37, around the tip 29 of the cathode assembly 25, through the anode front interior section 35, and out the plasma arc spray gun 1 through a hole 60 in the front cover 13. The circular velocity of the primary gas creates a vortex within the anode interior sections.

A fitting 62 is connected to a tapped radial hole 64 in the front housing 7. A ceramic or metallic powder is supplied via the fitting 62 to the anode front interior section 35 by means of the front housing hole 64 and one of the radial holes 41 in the anode 33. The powder is entrained in the primary gas stream as the gas flows through the anode interior section 35. The fitting 19 of the cathode holder 16 is connected to a sink for cooling water. A second water fitting 61 is brazed into a port 66 in the front housing 7. Suitable internal passages, not shown, in the front housing connect the port 66 to passages 63 and 65 in the center housing 5. The center housing passage 65 connects with the annular passage 31 and another passage 67 in the cathode holder 16. The passage 67 leads to an outlet port 68 in the fitting 19. In that manner, cooling water supplied to the fitting 61 passes through the various internal passages 66, 63, 65, 31, 67, and 68 to cool the plasma arc spray gun 1.

The fitting 19 of the cathode holder 16 and the water fitting 61 also serve as connectors for electrical cables, not shown. When electrical power is supplied to the plasma arc spray gun 1 through the fittings, an arc is created between the end 40 of the tip 29 of the cathode assembly 25 and the anode 33. Ideally, the point of contact of the arc with the anode moves circumferentially around the anode interior under the impetus of the angular velocity of the primary gas vortex. The arc heats the primary gas flowing past the cathode tip to create a plasma stream. The plasma stream heats the powder entering the anode front interior section 35 through the fitting 62 and accelerates the powder out the plasma arc spray gun 1 to be deposited onto a substrate in known manner. Typically, the deposition efficiency of the plasma arc spray gun is in the order of 50 percent.

Prior subsonic plasma arc spray guns 1 have been in commercial use for many years and have given countless hours of satisfactory service. On the other hand, they are subject to improvement. Specifically, it is desirable that their deposition efficiencies be increased above those presently attainable.

In addition, under some operating conditions the arc between the tip 29 of the cathode assembly 25 and the anode 33 tends to lock in at a specific point on the interior of the anode rather than to continuously travel circumferentially around the anode interior. The stationary arc causes the anode surface to pit. The result is a loss of performance of the plasma arc spray gun 1 to the extent that the anode must be replaced. A typical service life of prior anodes is approximately 40 hours. It is desirable to increase the anode service life.

A drawback of some prior plasma arc spray guns concerns the center housing, such as the center housing 5 of the plasma arc spray gun 1. The center housing is invariably manufactured from an electrically insulative material. In certain situations, the material can become dimensionally unstable. Atmospheric moisture and cooling water, among other influences, can cause the center housing to vary in size during operation. As a consequence, the primary gas that should enter the anode interior section 39 only through the annular space 57 and the holes 55 in the injector ring 47 actually leaks past the joints between the injector ring and the back end 45 of the anode 33 and the front end 23 of the cathode holder 16. The effect is an unstable plasma stream emitting from the outlet hole 60 of the plasma arc spray gun. The unstable plasma stream has detrimental effects on the spray process.

SUMMARY OF THE INVENTION

In accordance with the present invention, a plasma arc spray gun is provided that has higher quality construction and operating characteristics than prior spray guns. This is accomplished by apparatus that includes dimensionally stable insulative components and long wearing electrodes.

The plasma arc spray gun of the invention is comprised of a front housing, a center housing, and a rear housing. The three housings are connected to each other to form a rigid structure. Inside the housings are a cathode holder, cathode assembly, injector ring, and anode. Primary gas flowing through the injector ring and the anode and past the cathode assembly is heated to a plasma stream by an electrical arc extending between the cathode assembly and the anode. Powdered ceramic or metallic material introduced into the plasma stream within the anode interior is entrained in the plasma stream for spraying onto a substrate.

One aspect of the invention involves the use of a glass fiber reinforced TORLON material for the center housing. That material is an electrical insulator, and it is practically impervious to moisture and other atmospheric gases. Consequently, the insulating center housing is dimensionally stable under all operating conditions to thereby contribute to high quality plasma spraying.

In a relatively low velocity subsonic version of the plasma arc spray gun of the present invention, the anode is formed with five interior sections. There is a front interior section with a first cylindrical inner surface, a second interior section having a frusto-conical inner surface with a rather large first included angle, a middle interior section with a second cylindrical inner surface, a fourth interior section having a frusto-conical surface with a second included angle less than the first included angle, and a back interior section having a frusto-conical surface with a third included angle that is less than the second included angle. The longitudinal lengths of the anode interior sections and the three included angles of the respective frusto-conical surfaces are carefully controlled. The cathode assembly is designed such that the end of a tip thereof is approximately at the longitudinal midpoint of the anode middle interior section.

During operation of the subsonic plasma arc spray gun, the primary gas flows with the turbulence, and the gas exerts a downstream force on the electrical arc existing between the cathode assembly tip and the anode. The force of the turbulent primary gas causes the arc to extend and attach to the anode at the circular line at the junction of the front and second interior sections of the anode.

An outstanding and unexpected advantage of the five-section interior of the anode of the present invention is that it contributes to substantially increased deposition efficiency of the plasma arc spray gun due primarily to a resultant longer dwell time of the powder particles in the plasma stream. Another contributing factor to the increased deposition efficiency is the location of the cathode assembly tip inside the anode interior. The combined result is that for practically any set of operating conditions, the plasma arc spray gun of the present invention exhibits a minimum of 15 percentage points increase in deposition efficiency over prior spray guns. At the same time, the service lives of anodes made in accordance with the present invention is approximately triple the service lives of prior anodes.

In a modified version of the present invention in which the velocity of the plasma stream approaches supersonic velocity, the anode has three interior sections: a middle section with a frusto-conical inner surface, and front and back interior sections with respective cylindrical inner surfaces. The tip of a cathode assembly is carefully located inside the anode.

Further in accordance with the present invention, the gas dynamics of the primary gas flowing through the high velocity subsonic plasma arc spray gun are greatly improved. To achieve that result, the cathode assembly is designed to eliminate all abrupt steps in its outer surfaces. In addition, the step between the inner diameter of the anode back interior section and the injector ring inner diameter is eliminated. The result is a streamlined annular passage for the primary gas, which is introduced with a tangential component of velocity. The primary gas flows with laminar flow from the injector ring in a controlled vortex past the cathode assembly tip.

The arc point of attachment constantly travels around a circular line formed by the junction of the cylindrical and frusto-conical inner surfaces of the anode front and middle interior sections, respectively. In that manner, molecular erosion of the anode is distributed along the circular line rather than being concentrated at one or a few points. The result is that the anode life is greatly increased compared with prior anodes.

The anode of the present invention, its placement relative to the cathode assembly tip, and the streamlined annular passage for the primary gas combine to produce a high velocity subsonic plasma arc spray gun that has greatly improved operating characteristics compared with prior high velocity subsonic spray guns. Specifically, the anode has approximately three times the useful life as prior anodes. At the same time, the deposition efficiency is increased. Another improvement is that the more streamlined flow of the primary gas cools the cathode assembly tip in an improved manner so that cathode assembly life is also increased.

The high velocity subsonic version of the plasma arc spray gun of the present invention employs the same stable material for the center housing as the lower velocity spray guns. Consequently, the beneficial results of a stable plasma stream under all operating conditions that are achieved by the lower velocity plasma arc spray gun are also realized by the high velocity subsonic spray gun.

The plasma arc spray gun of the present invention thermally sprays coatings onto substrates with an increased deposition efficiency compared with prior spray guns. At the same time, the plasma arc spray gun of the present invention exhibits dimensional stability under all operating conditions and contains components having increased service lives.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 3:
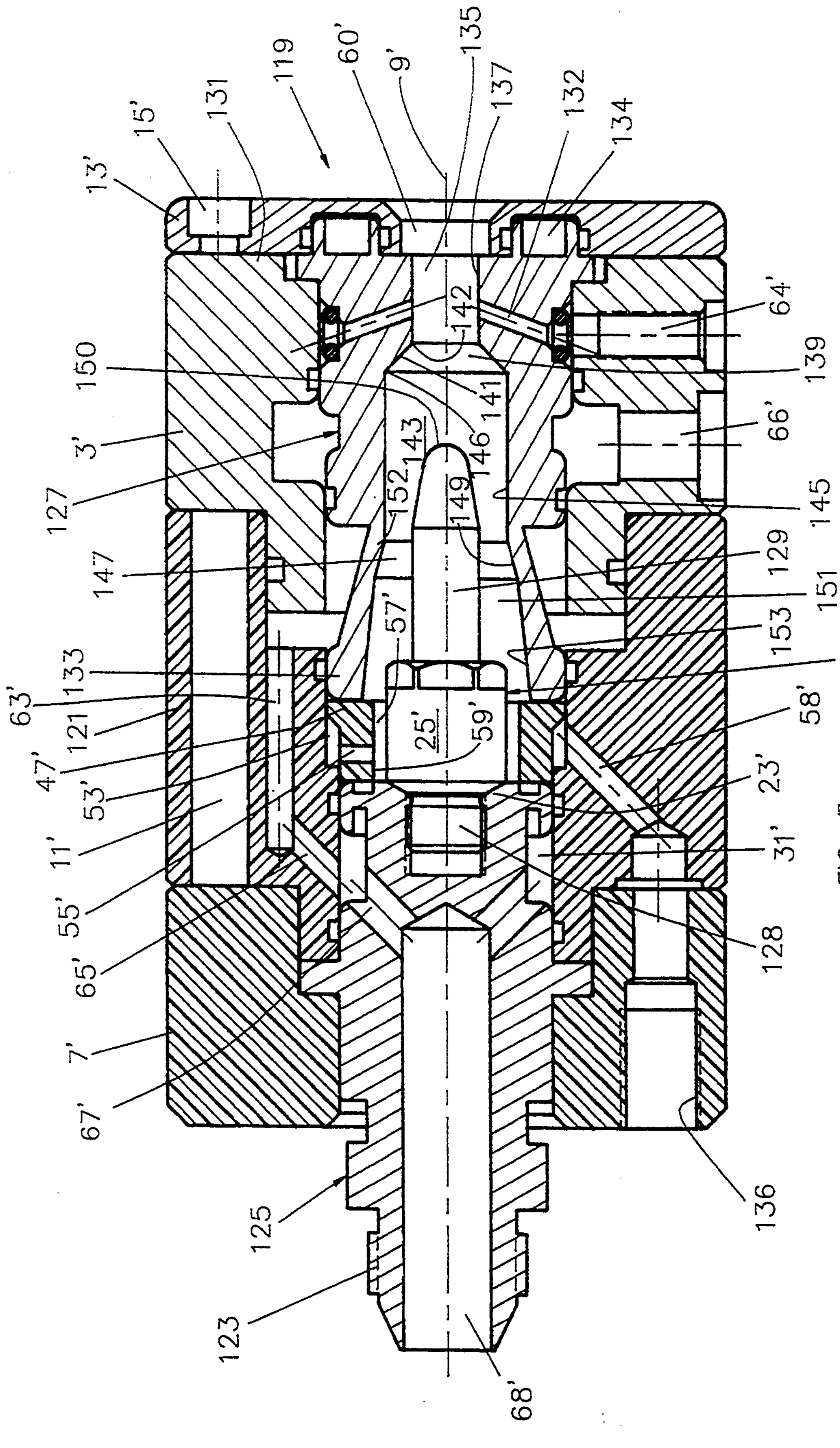
FIG. 3 is a longitudinal cross sectional view of a relatively low velocity subsonic plasma arc spray gun according to the present invention.

Referring to FIG. 3, a subsonic plasma arc spray gun 119 is illustrated that includes the present invention. The plasma arc spray gun 119 is particularly useful for thermal spraying ceramic and metallic particles onto a substrate, not shown. However, it will be understood that the invention is not limited to material coating applications.

Figure 1:
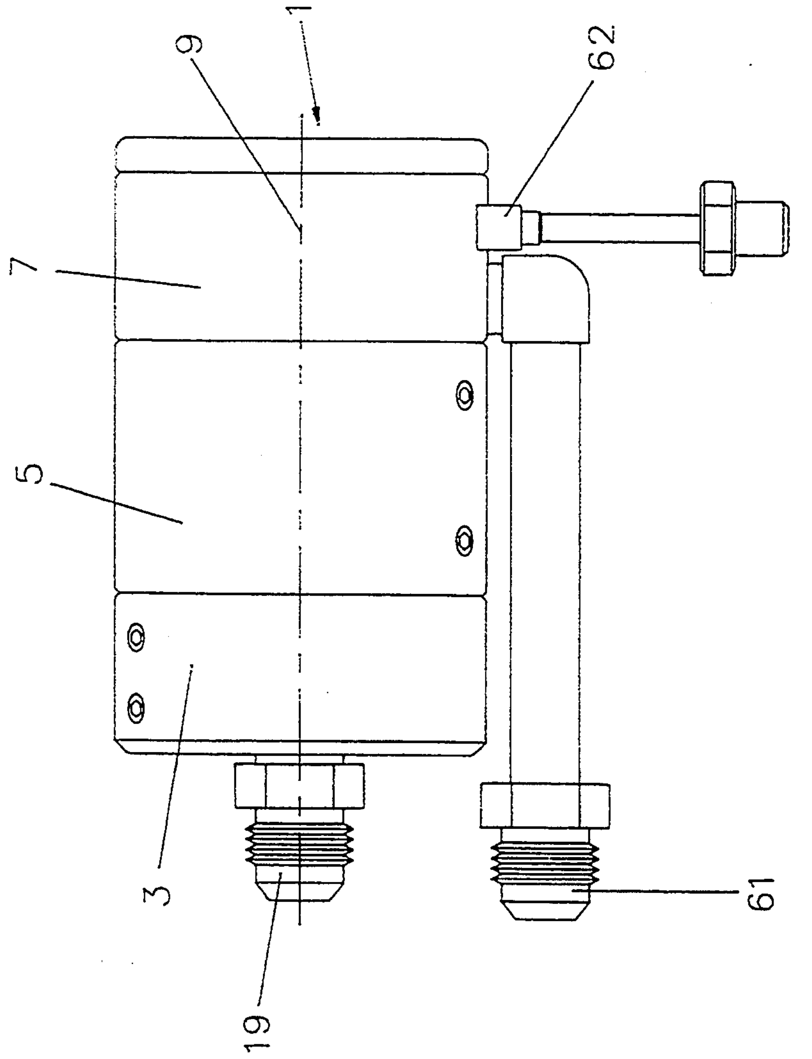
FIG. 1 PRIOR ART
FIG. 1 is a front view of a typical prior plasma arc spray gun.

The exterior of the plasma arc spray gun 119 is generally similar in appearance to the plasma arc spray gun 1 described previously in connection with FIGS. 1 and 2. The plasma arc spray gun 119 is comprised of a front housing 3', a center housing 121, and a rear housing 7'. The three housings 3', 121, and 7' are generally tubular in shape, having respective longitudinal axes. The three housings are connected in endwise fashion to have a common longitudinal axis 9'. Connection of the three housings may be by screws, not shown, having their heads in counterbored holes in the front housing, extending through holes 11' in the center housing, and threaded into tapped holes in the rear housing.

Inside the housings 3', 121, and 7' are a cathode holder 125, an injector ring 47', and an anode 127. The cathode holder 125 is retained in the interior of the rear housing 7' and the center housing 121. The cathode holder has a front end 23'. The back end of the cathode holder is manufactured as a hollow threaded fitting 123. Screwed into the front end 23' of the cathode holder by means of a threaded shank 128 is a cathode assembly 130. The cathode assembly 130 includes a tip 129.

The anode 127 is retained in the interior of the front housing 3' and the center housing 121. The anode is generally tubular in shape, having a front end 131 and a back end 133.

The injector ring 47' is sandwiched between the back end 133 of the anode 127 and the front end 23' of the cathode holder 125. The outer diameter of the injector ring and a portion of the inner surface of the center housing 121 cooperate to form an annular passage 53'. A passage 58' in the center housing leads between the annular passage 53' and a mating passage 136 in the rear housing 7'. A gas fitting, not shown, is screwed into the rear housing passage 136. The gas fitting is connected to a source of inert primary gas, such as argon or helium. A series of holes 55' extend through the injector ring. The holes 55' are generally radial to the inner diameter 59' of the injector ring.

A source of particulate coating material is connected to a port 64' in the front housing 3'. The port 64' connects through a suitable seal to a radial hole 132 in the anode 127. The hole 132 extends to the interior of the anode.

A front cover 13' is attached to the front housing 3', as by screws, not shown, passing through counterbored holes 15'. The front cover 13' has a central hole 60' through it.

The plasma arc spray gun 119 includes several interconnected internal passages through which cooling water can flow. Cooling water enters the front housing 3' through a radial port 66' and flows through appropriate longitudinal passages, not shown, in the anode 127 to an annular groove 134 in the cover 13'. The cover groove 134 is also connected by other passages in the anode to passages 63' and 65' in the center housing 121. The center housing passage 65' connects via a annular passage 31' to a passage 67' in the cathode holder 125. The passage 67' connects with an outlet passage 68' in the interior of the hollow fitting 123. In that manner, water enters the plasma arc spray gun through the port 66', flows continuously through the interior of the plasma arc spray gun, and flows out the cathode holder outlet passage 68'.

In accordance with the present invention, the interior of the anode 127 is fabricated with five sections. A front section 135 has a cylindrical inner surface 137. A second interior section 139 has a frusto-conical inner surface 141 with the apex thereof pointing toward the first interior section 135. The cylindrical inner surface 137 of the front interior section and the frusto-conical surface 141 of the second interior section 139 intersect in a first circular line 142. There is a middle interior section 143 with a cylindrical inner surface 145. The cylindrical inner surface 145 of the middle interior section 143 intersects the frusto-conical inner surface 141 of the second interior section 139 in a second circular line 146. A fourth interior section 147 has a frusto-conical surface 149, and a back interior section 151 has a frusto-conical surface 153. The cylindrical inner surface 145 of the middle interior section 143 intersects the frusto-conical inner surface 149 of the fourth interior section 147 in a third circular line 152.

The proportions of the anode interior sections 135, 139, 143, 147, and 151 are very important for the successful operation of the plasma arc spray gun 119. Considering the longitudinal length of the anode 127 along the axis 9', the length of the first section 135 is between approximately 15 percent and 25 percent of the total length of the anode. The length of the second section 139 is between approximately 5 and 10 percent of the total anode length. The lengths of the middle, fourth, and back sections are between approximately 35–45 percent, 5–10 percent, and 25–35 percent, respectively, of the total anode length. Similarly, the relative included angles of the frusto-conical inner surfaces 141, 149, and 153 are important. Specifically, the included angle of the frusto-conical surface 141 is between approximately two and four times greater than the included angle of the frusto-conical surface 149. In turn, the included angle of the frusto-conical surface 149 is between approximately two and three times greater than the included angle of the frusto-conical surface 153 of the anode back interior section 151.

To obtain the unexpectedly high performance that characterizes the subsonic plasma arc spray gun 119, the relative locations of the cathode assembly 130 and the anode 127 must be carefully controlled. It is important that the cathode assembly tip 129 extend well into the anode interior. Particularly, the end 150 of the cathode assembly tip 129 is located at a distance of between approximately 55 percent and 65 percent of the distance from the third circular line 152 to the second circular line 146. Other important parameters include a diameter for the middle interior section surface 145 that is between approximately 1.5 and 2.5 times greater than the diameter of the inner surface 137 of the front interior section 135. In addition, the diameter of the anode middle interior section inner surface 137 is between approximately 1.5 and 2.5 times larger than the diameter of the cathode assembly tip 129.

In operation, cooling water is introduced into the plasma arc spray gun 119 through a fitting brazed into the port 66' of the front housing 3'. The water flows through the various internal passages in the spray gun and out the fitting 123 of the cathode holder 125. Primary gas is supplied to the plasma arc spray gun through passages 58' and 53' and radial holes 55' to the annular space 57'. From the annular space 57', the primary gas flows with turbulence in a downstream direction through the interior sections 151, 147, and 143 of the anode 127, surrounding the cathode assembly tip 129. Finally, the gas flows through the anode interior sections 139 and 135 and out of the plasma arc spray gun through the hole 60' in the front cover 13'.

Electrical power is applied to the plasma arc spray gun 119 to create an electrical arc between the cathode assembly 130 and the anode 127. For that purpose, a direct current power lead is connected to the front housing 3', such as by the fitting that introduces the cooling water to the plasma arc spray gun. A negative electrical lead is connected to the hollow fitting 123 of the cathode holder 125. The arc heats the primary gas and turns it into a plasma stream as it emerges from the spray gun. The coating powder introduced into the interior of the anode through the holes 64' and 132 is entrained in the plasma stream and is accelerated out the plasma arc spray gun with the plasma stream.

An outstanding feature of the present invention is that the electrical arc is controlled to extend between the end 150 of the tip 129 of the cathode assembly 130 and the first circular line 142 in the anode interior. Because of the geometry of the anode interior and its dimensional relationship with the cathode assembly, an increase in service life of three times is not unusual for the anode 127 compared with prior anodes.

As an example of a plasma arc spray gun 119 that incorporates the features of the present invention, an anode 127 was chosen that has an overall longitudinal length along axis 9' of 2.06 inches. The length of the first interior section 135 of the anode interior was 0.41 inches. The length of the second interior section 139 was 0.13 inches; the length of the middle interior section 143 was 0.77 inches; the length of the fourth interior section 147 was 0.18 inches; and the length of the back interior section 151 was 0.56 inches. The included angle of the frusto-conical inner surface 141 of the second interior section 139 was 90 degrees. The included angle of the frusto-conical inner surface 149 of the fourth interior section 147 was 30 degrees. The included angle of the frusto-conical inner surface 153 of the back interior section 151 was 12 degrees. The diameter of the inner surface 137 of the front interior section 135 was 0.31 inches. The diameter of the inner surface 145 of the middle interior section 143 was 0.58 inches. The end 150 of the tip 129 of the cathode assembly 130 was located approximately 0.44 inches from the anode third circular line 152. The diameter of the cathode assembly tip was approximately 0.31 inches.

The plasma arc spray gun 119 incorporating the foregoing annode 127 was subjected to laboratory tests in which various operating parameters were varied. A nominal current of nine hundred amps at 35 volts was applied to the plasma arc spray gun 119. The primary gas was argon applied at 80 cubic feet per hour. Eight pounds per hour of coating powder was entrained in the primary gas by means of a carrier gas flowing at ten cubic feet per hour. Cooling water was supplied at eight gallons per minute. The spray gun was tested under extreme conditions that subjected it to the limits of its capabilities. Nevertheless, the anode 127 performed satisfactorily for approximately 120 hours of operation. That life was far superior to the approximately 40 hours of life that could be expected from prior anodes. In addition, the deposition efficiency of the sprayed powder was as high as 89 percent. That was a substantial increase over the deposition efficiency of approximately 50 percent that is typical of prior plasma arc spray guns operating under similar conditions. When the spray gun was field tested under production conditions in which operating parameters were held constant, the annode performed properly for approximately 1,000 hours.

An important feature of the plasma arc spray gun 119 is that the center housing 121 is made of an exceptionally stable insulating material. Although the center housings of prior plasma arc spray guns are also normally made from an insulating material, the material used in prior spray guns was not necessarily sufficiently stable in operation to enable the prior spray guns to perform satisfactorily.

To solve the problem associated with unstable center housings that plagued prior plasma arc spray guns, the center housing 121 of the plasma arc spray gun 119 is made from a 30 percent glass fiber reinforced TOR- LON material marketed by Amoco Corporation. That material is impervious to moisture, and it remains stable under all operating conditions of the plasma arc spray gun, thus contributing to the improved life and deposition efficiency of the present invention.

Figure 4:
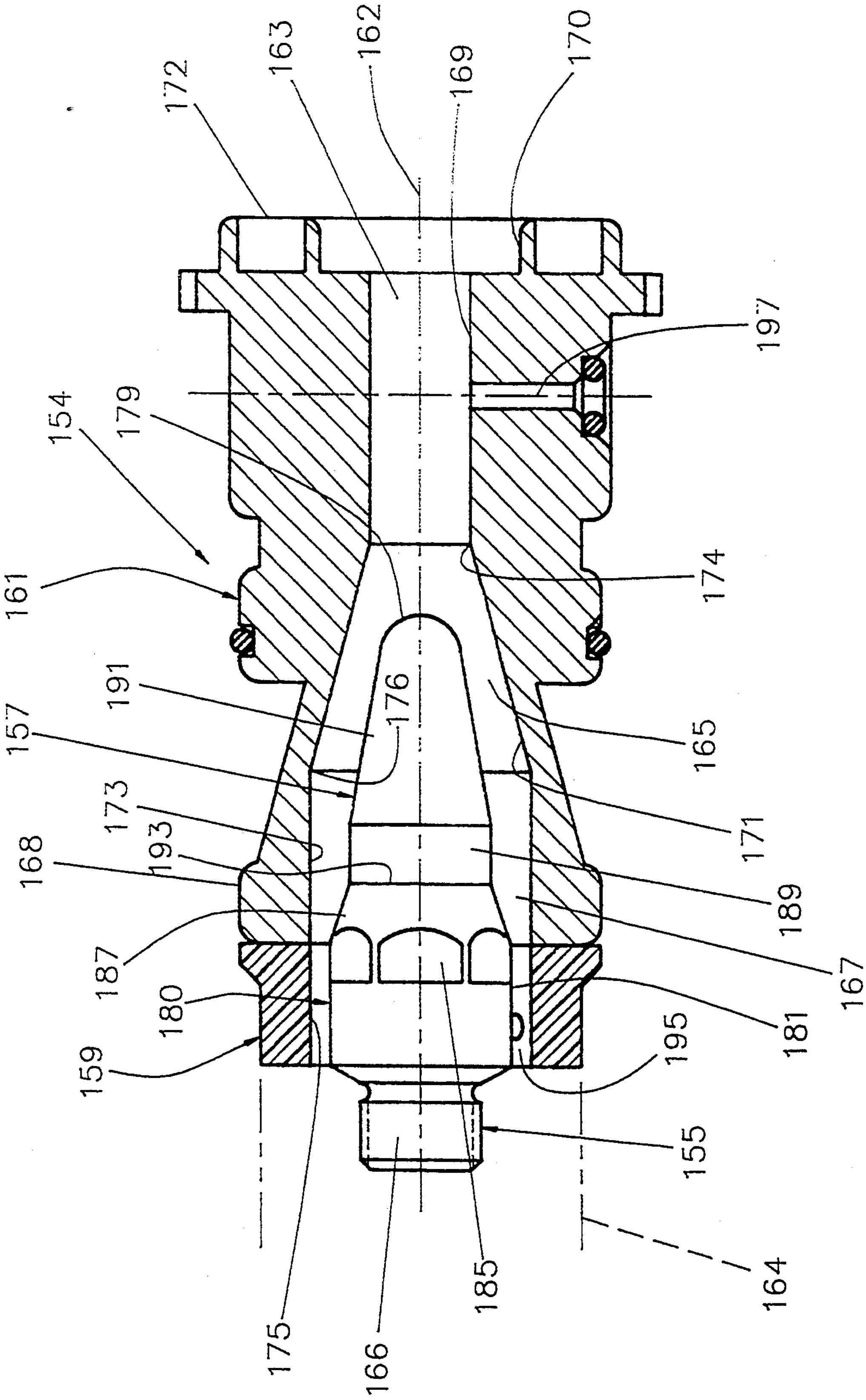
FIG. 4 is a partial longitudinal cross sectional view of a high velocity subsonic plasma arc spray gun according to the present invention.

Further in accordance with the present invention, greatly improved anode life and deposition efficiency are obtained with subsonic plasma arc spray guns in which the velocity of the plasma stream approaches supersonic velocity. Turning to FIG. 4, an assembly 154 consisting of a cathode assembly 155 with a tip 157, injector ring 159, and anode 161 is shown that form part of a high velocity subsonic plasma arc spray gun. The remainder of the high velocity subsonic spray gun, including housings and fittings, is substantially similar to the respective components of the plasma arc spray gun 119 described previously in conjunction with FIG. 3. The cathode assembly 155, injector ring 159, and anode 161 of the assembly 154 have respective longitudinal axes that are coaxial and that are collectively represented by reference numeral 162.

The insulated center housing of the high velocity subsonic spray gun that uses the assembly 154 is made from the same stable glass fiber reinforced TORLON material as the center housing 121 of the plasma arc spray gun 119 of FIG. 3. The cathode assembly 155 includes a threaded shank 166 that screws into a cathode holder 164 similar to the cathode holder 125 of the subsonic plasma arc spray gun 119 described previously. The injector ring 159 may be generally similar to the injector ring 47' of the plasma arc spray gun 119, but the injector ring 159 has tangential inlet holes, not shown, rather than the radial holes 55' of the injector ring 47'.

The anode 161 of the assembly 154 of FIG. 4 has an external contour 168 that is generally similar to the external contour of the anode 127 of the plasma arc spray gun 119 of FIG. 3. The interior of the anode 161 is fabricated with three sections along the longitudinal axis 162: a front section 163, a middle section 165, and a back section 167. The front interior section 163 has a cylindrical inner surface 169. There is a counterbore 170 in the anode downstream end 172. The middle interior section 165 has a frusto-conical inner surface 171 with the apex thereof pointing toward the front interior section. The front interior section cylindrical surface 169 intersects the middle interior section frusto-conical surface 171 along a first circular line 174. The back interior section 167 has a cylindrical inner surface 173. The inner surface 173 of the back interior section intersects the inner surface 171 of the middle interior section along a second circular line 176.

In the construction of the high velocity subsonic plasma arc spray gun of FIG. 4, the relative lengths along the longitudinal axis 162 of the three anode interior sections 163, 165, and 167 are as follows. The longitudinal length of the front interior section, excluding the counterbore 170, is between approximately 35 and 45 percent of the total anode length (excluding the counterbore) along the longitudinal axis 162. The length of the middle section, 165 is between approximately 30 and 40 percent of the total anode length, and the length of the back section 167 is between approximately 20 and 30 percent of the total anode length. A preferred included angle for the frusto-conical surface 171 is between approximately 25 and 35 degrees. The diameter of the back interior section cylindrical surface 173 is preferably between 1.5 and 3 times larger than the diameter of the front interior section surface 169. The tip 157 of the cathode assembly 155 has a cylindrical surface 189 that is between about 35 percent and 45 percent greater in diameter than the inner diameter of the anode front interior section 163.

The location of the end 179 of the tip 157 of the cathode assembly 155 is very important for the proper performance of the subsonic plasma arc spray gun associated with the assembly 154. The tip end 179 must be located within the middle interior section 165 of the anode 161. Specifically, a location for the tip end at a point that is between approximately 65 percent and 75 percent of the distance from the second circular line 176 to the first circular line 174 works very well.

An example of an anode 161 that gives very satisfactory results is as follows. The anode has an overall length along the longitudinal axis 162 of 2.06 inches, excluding the counterbore 170. The front interior section 163 has a longitudinal length, excluding the counterbore 170, of approximately 0.83 inches and an inner diameter of 0.31 inches. The included angle of the frusto-conical surface 171 of the middle interior section 165 is 30 degrees, and the longitudinal length of the middle section is 0.70 inches. The back section 167 has an inner diameter of 0.69 inches and a longitudinal length of 0.53 inches. The end 179 of the tip 157 of the cathode assembly 155 is located 0.48 inches from the circular line 176.

To further enhance the performance of a plasma arc spray gun with the high velocity subsonic assembly 154, the primary gas flows within a streamlined annular passage from the injector ring 159 to the anode front interior section 163. For that purpose, the diameter of the anode back interior section cylindrical surface 173 is the same size as the inner diameter 175 of the injector ring 159. Consequently, the step between the inner diameters of the injector ring and the anode back interior section that characterizes prior high velocity subsonic plasma arc spray guns has been eliminated. In addition, the cathode assembly 155 is manufactured with a streamlined contour. The cathode assembly includes a fitting section 180 with a cylindrical surface 181 that is somewhat smaller in diameter than the inner diameter 175 of the injector ring 159. Downstream, that is, to the right with respect to FIG. 4, of the cylindrical surface 181 of the cathode assembly fitting section 180 are a series of flats 185 that are used to screw the cathode assembly into the cathode holder 164. Downstream of the fitting section flats 185 is a frusto-conical surface 187.

The tip 157 of the cathode assembly 155 has a cylindrical surface 189. Downstream of the cylindrical surface 189 of the tip 157 is a frusto-conical surface 191. The apex end of the frusto-conical surface 191 blends into the spherical end 179 of the tip 157. Optimum performance of the assembly 154 is achieved by manufacturing the frusto-conical surface 187 of the assembly fitting section 180 to intersect the tip cylindrical surface 189. That is, the fitting section frusto-conical surface 187 and the tip cylindrical surface 189 intersect along a circular line 193. In that way, there are no steps or other abrupt changes in cross section between the fitting section cylindrical surface 181 and the tip end 179.

In operation, primary gas is introduced to the assembly 154 through the tangential holes, not shown, in the injector ring 159. The primary gas flows in a controlled downstream vortex through the annular space 195 between the inner diameter 175 of the injector ring and the outer surface 181 of the fitting section 180 of the cathode assembly 155. The primary gas continues to flow as a vortex over the fitting section frusto-conical surface 187 and the cylindrical surface 189 and frusto-conical surface 191 of the tip 157.

An electrical arc is created between the anode 161 and the tip 157 of the cathode assembly 155. Specifically, the arc extends from the tip end 179 to the first circular line 174 in the anode interior. The vortex action of the primary gas in connection with the optimized configuration of the anode interior sections 163, 165, and 167 causes the point of attachment of the arc from the anode circular line 174 to travel continuously around that line. As a result, molecular erosion of the anode is distributed evenly around the line 174. The constantly changing point of emission for the arc results in a much slower wear rate for the anode 161 than for prior anodes. As the primary gas flows past the electrical arc, it is heated into a plasma stream. Coating powder fed through holes 197 in the anode 161 is entrained in the plasma stream.

The structural features of the cathode assembly 155 and the anode 161 combine to provide a high velocity subsonic plasma arc spray gun having an increased deposition efficiency and a longer anode service life than prior plasma arc spray guns of equivalent velocities. In addition, the improved gas dynamics that result from the streamlined configuration of the cathode assembly 155 increases the cooling of the tip 157. Consequently, an added benefit of the assembly 154 is increased life for the tip. Thus, the structural features as described combine to provide a high velocity subsonic plasma arc spray gun having substantially increased performance.

Figure 2:
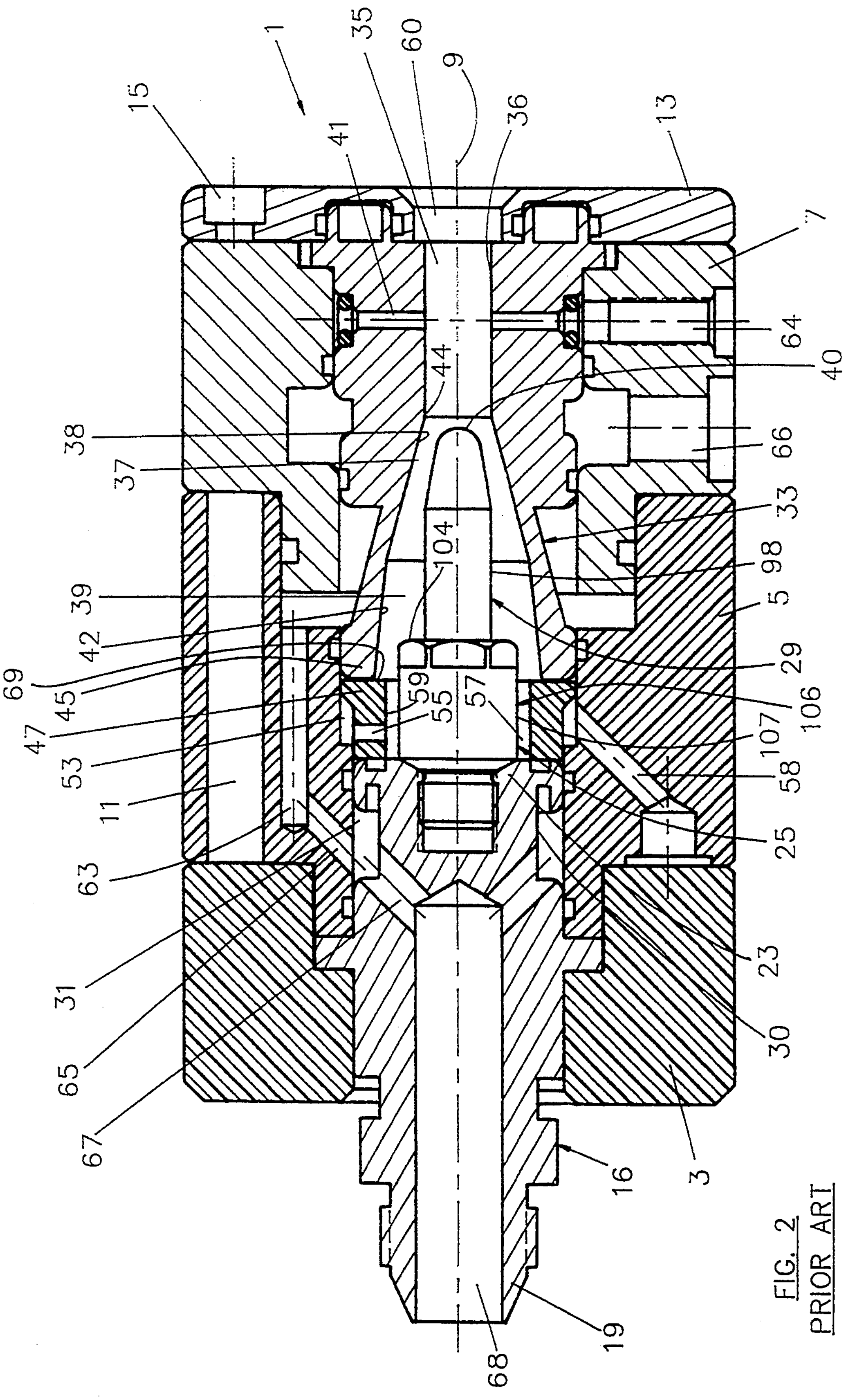
FIG. 2 PRIOR ART
FIG. 2 is a longitudinal cross sectional view of a prior subsonic plasma arc spray gun.
Figure 5:
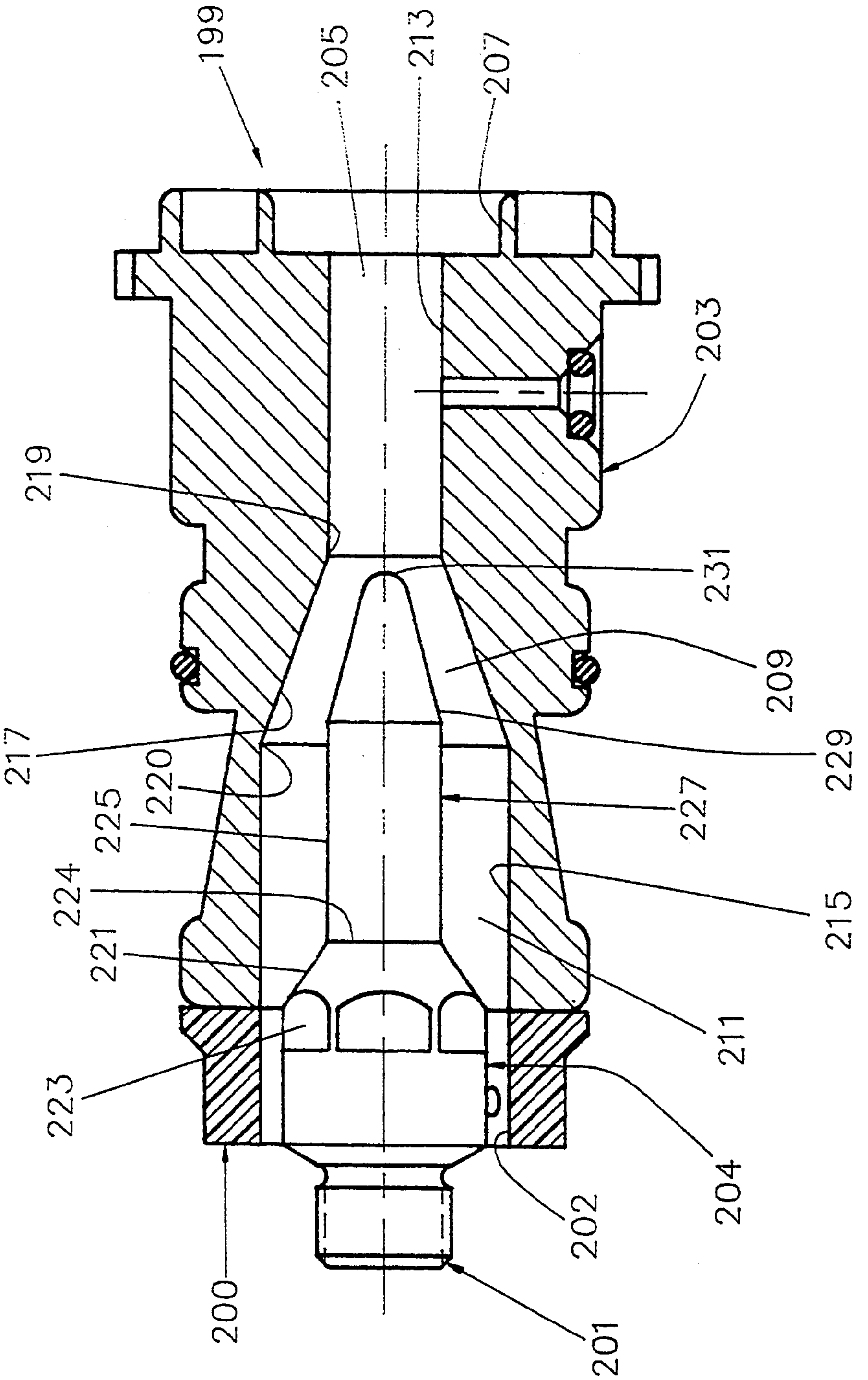
FIG. 5 is a partial longitudinal cross sectional view of a modified high velocity subsonic plasma arc spray gun according to the present invention.

Now looking at FIG. 5, an assembly 199 is depicted that is also suitable for a high velocity subsonic plasma arc spray gun. The assembly 199 is generally similar to the assembly 154 for the plasma arc spray gun as described above in connection with FIG. 4. An insulative center housing similar to the center housing 3 of the plasma arc spray gun 1 of FIG. 2 is used with the assembly 199.

The assembly 199 includes an injector ring 200, a streamlined cathode assembly 201, and an anode 203. The interior of the anode 203 has a front section 205 and a counterbore 207. The front interior section 203 has a length that is between approximately 35 percent and 45 percent of the total anode longitudinal length, excluding the counterbore 207. An anode middle interior section 209 is between approximately 20 and 30 percent of the total longitudinal length of the anode. A back section 211 has a longitudinal length having between approximately 30 and 40 percent of the total anode length. The front interior section 205 and the back interior section 211 have respective cylindrical inner surfaces 213 and 215. The middle interior section 209 has a frusto-conical inner surface 217. The included angle of the inner surface 217 is between approximately 35 and 45 degrees. The front section inner surface 213 and the middle section inner surface 217 intersect in a first circular line 219. The middle interior section inner surface and the back interior section inner surface intersect in a second circular line 220. The diameter of the back interior section inner surface is between approximately 1.5 and three times larger than the diameter of the front interior section inner surface. The diameter of the inner surface 215 of the anode back interior section 211 is the same as the inner diameter 202 of the injector ring 200.

The cathode assembly 201 has a fitting section 204 with a frusto-conical surface 221 between some flats 223 and the fitting section front end 224. A cylindrical surface 225 of a tip 227 extends from the frusto-conical surface 221 and protrudes into the anode middle section 209. The cathode tip 227 terminates in a frusto-conical surface 229 and a rounded end 231. The tip end 231 is located at a distance of between approximately 85 and 95 percent of the longitudinal distance from the second circular line 220 to the first circular line 219. The tip cylindrical surface 225 has approximately the same diameter as that of the inner surface 213 of the anode front interior section 205. The tip cylindrical surface 225 extends into the anode middle interior section 209.

An example of a successful assembly 199 is as follows. The anode 203 has an overall length, excluding the counterbore 207, of 2.06 inches, a length for the front interior section 205 of 0.83 inches, a length for the center interior section 209 of 0.52 inches, and a length for the back interior section 211 of 0.71 inches. The included angle for the frusto-conical surface 211 is 40 degrees. The inner diameter of the front section inner surface 213 is 0.31 inches, and the inner diameter of the back section inner surface 215 is 0.69 inches. The distance of the end 231 of the tip 227 of the cathode assembly 201 from the circular line 219 is 0.05 inches.

A plasma arc spray gun with the foregoing assembly 199 was operated at 35 volts and 900 amps. A primary gas of argon was applied at 80 cubic feet per hour. Eight pounds per hour of coating powder was entrained in a carrier gas, which was supplied at 10 cubic feet per hour. The cooling water flow was eight gallons per minute. The anode 203 exhibited over three times the service life of prior anodes in high velocity subsonic plasma arc spray guns. In addition, the service life of the cathode assembly 201 increased and the deposition efficiency was at least 15 percentage points higher compared with prior high velocity subsonic spray guns.

In summary, the results and advantages of subsonic plasma arc spray guns can now be more fully realized. The insulative center housing of the plasma arc spray gun of the present invention provides stability to the plasma stream under all operating conditions. That desirable result comes from making the insulative center housing of a fiber reinforced TORLON material. It will also be recognized that in addition to the superior performance of the insulative center housing, the constructions of the anode and cathode assembly are such as to significantly improve their service lives and the deposition efficiency of the coating powder compared with prior plasma arc spray guns. The increase in performance occurs in subsonic and supersonic plasma arc spray guns having both relatively low and relatively high subsonic velocities.

Thus, it is apparent that there has been provided, in accordance with the invention, a plasma arc spray gun that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A subsonic plasma arc spray gun comprising:

a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back end, the front and middle interior sections having respective cylindrical inner surfaces coaxial with the longitudinal axis and the second, fourth, and back interior sections having respective frusto-conical inner surfaces coaxial with the longitudinal axis;
b. a cathode holder having a longitudinal axis coaxial with the anode longitudinal axis;
c. a cathode assembly held in the cathode holder, the cathode assembly including a tip having an end located within the anode middle interior section;
d. injector means interposed between the cathode holder and the back end of the anode for introducing a primary gas to flow into the anode interior from the back end thereof and out the anode front end;
e. housing means for retaining the anode, cathode holder, and injector means as an assembly;
f. first passage means for supplying the primary gas through the housing means to the injector means;
g. first fitting means for supplying electrical power to the anode and the cathode assembly to create an arc therebetween in the anode interior to heat the primary gas flowing in the anode interior into a plasma stream;
h. second passage means for supplying a coating powder to the anode interior whereat the coating powder is entrained in the plasma stream and accelerated thereby out the anode front end; and
i. cooling means for supplying cooling fluid to the cathode holder, anode, and housing means.

2. A plasma arc spray gun comprising:
a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back end, the front and middle interior sections having respective cylindrical inner surfaces coaxial with the longitudinal axis and the second, fourth, and back interior sections having respective frusto-conical inner surfaces coaxial with the longitudinal axis, wherein:
   i. the inner surface of the anode front interior section intersects the inner surface of the anode second interior section in a first circular line;
   ii. the inner surface of the anode second interior section intersects the inner surface of the anode middle interior section in a second circular line; and
   iii. the inner surface of the anode middle interior section intersects the inner surface of the anode fourth interior section in a third circular line;
b. a cathode holder having a longitudinal axis coaxial with the anode longitudinal axis;
c. a cathode assembly held in the cathode holder, the cathode assembly including a tip having an end located within the anode middle interior section, wherein the end of the cathode tip is located between approximately 55 percent and 65 percent of the distance from the third circular line to the second circular line;
d. injector means interposed between the cathode holder and the back end of the anode for introducing a primary gas to flow into the anode interior from the back end thereof and out the anode front end;
e. housing means for retaining the anode, cathode holder, and injector means as an assembly;
f. first passage means for supplying the primary gas through the housing means to the injector means;
g. first fitting means for supplying electrical power to the anode and the cathode assembly to create an arc therebetween in the anode interior to heat the primary gas flowing in the anode interior into a plasma stream;
h. second passage means for supplying a coating powder to the anode interior whereat the coating powder is entrained in the plasma stream and accelerated thereby out the anode front end; and
i. cooling means for supplying cooling fluid to the cathode holder, anode, and housing means.

3. A subsonic plasma arc spray gun comprising:
a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back end, the front and middle interior sections having respective cylindrical inner surfaces and the second, fourth, and back interior sections having respective frusto-conical inner surfaces, wherein:
   i. the anode has a total longitudinal length along the longitudinal axis thereof between the front and back ends;
   ii. the anode front interior section has a longitudinal length along the anode longitudinal axis of between approximately 15 percent and 25 percent of the anode total longitudinal length;
   iii. the anode second interior section has a longitudinal length along the anode longitudinal axis of between approximately 5 percent and 10 percent of the total anode longitudinal length;
   iv. the anode middle interior section has a longitudinal length along the anode longitudinal axis of between approximately 35 percent and 45 percent of the total anode length;
   v. the anode fourth interior section has a longitudinal length along the anode longitudinal axis of between approximately 5 percent and 10 percent of the anode total length; and
   vi. the anode back interior section has a longitudinal length along the anode longitudinal axis of between approximately 25 percent and 35 percent of the total anode length;
b. a cathode holder having a longitudinal axis coaxial with the anode longitudinal axis;
c. a cathode assembly held in the cathode holder, the cathode assembly including a tip having an end located within the anode middle interior section;
d. injector means interposed between the cathode holder and the back end of the anode for introducing a primary gas to flow into the anode interior from the back end thereof and out the anode front end;

e. housing means for retaining the anode, cathode holder, and injector means as an assembly;

f. first passage means for supplying the primary gas through the housing means to the injector means;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode front end; and i. cooling means for supplying cooling fluid to the cathode holder, anode, and housing means.

4. A subsonic plasma arc spray gun comprising:

a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back end, the front and middle interior sections having respective cylindrical inner surfaces and the second, fourth, and back interior sections having respective frusto-conical inner surfaces, wherein:

i. the frusto-conical inner surface of the anode back interior section has a first included angle;

ii. the frusto-conical inner surface of the anode fourth interior section has a second included angle that is between approximately two and three times larger than the first included angle; and iii. the frusto-conical inner surface of the anode second interior section has a third included angle that is between approximately two and four times larger than the second included angle;

b. a cathode holder having a longitudinal axis coaxial with the anode longitudinal axis;

c. a cathode assembly held in the cathode holder, the cathode assembly including a tip having an end located within the anode middle interior section;

d. injector means interposed between the cathode holder and the back end of the anode for introducing a primary gas to flow into the anode interior from the back end thereof and out the anode front end;

e. housing means for retaining the anode, cathode holder, and injector means as an assembly;

f. first passage means for supplying the primary gas through the housing means to the injector means;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode front end; and i. cooling means for supplying cooling fluid to the cathode holder, anode, and housing means.

5. A subsonic plasma arc spray gun comprising:

a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back end, the front and middle interior sections having respective cylindrical inner surfaces and the second, fourth, and back interior sections having respective frusto-conical inner surfaces, wherein:

i. the anode has an overall length along the longitudinal axis thereof between the front and back ends of approximately 2.06 inches;

ii. the anode front interior section has a longitudinal length along the anode longitudinal axis of approximately 0.41 inches;

iii. the anode second interior section has a longitudinal length along the longitudinal axis thereof of approximately 0.13 inches;

iv. the anode middle interior section has a longitudinal length along the anode longitudinal axis of approximately 0.77 inches;

v. the anode fourth interior section has a longitudinal length along the anode longitudinal axis of approximately 0.18 inches;

vi. the anode back interior section has a longitudinal length along the anode longitudinal axis of approximately 0.56 inches;

vii. the frusto-conical inner surface of the anode second interior section has an included angle of approximately 90 degrees;

viii. the frusto-conical inner surface of the anode fourth interior section has an included angle of approximately 30 degrees; and ix. the frusto-conical inner surface of the anode back interior section has an included angle of approximately 12 degrees;

b. a cathode holder having a longitudinal axis coaxial with the anode longitudinal axis;

c. a cathode assembly held in the cathode holder, the cathode assembly including a tip having an end located within the anode middle interior section;

d. injector means interposed between the cathode holder and the back end of the anode for introducing a primary gas to flow into the anode interior from the back end thereof and out the anode front end;

e. housing means for retaining the anode, cathode holder, and injector means as an assembly;

f. first passage means for supplying the primary gas through the housing means to the injector means;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode front end; and i. cooling means for supplying cooling fluid to the cathode holder, anode, and housing means.

6. A subsonic plasma arc spray gun comprising:

a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back ends, the front and middle interior sections having respective cylindrical inner surfaces coaxial with the longitudinal axis and the second, fourth, and back interior sections having respective frusto-conical inner surfaces coaxial with the longitudinal axis;

b. a cathode holder having a longitudinal axis coaxial with the anode longitudinal axis;

c. a cathode assembly held in the cathode holder, the cathode assembly including a tip having an end located within the anode middle interior section;

d. injector means interposed between the cathode holder and the back end of the anode for introducing a primary gas to flow into the anode interior from the back end thereof and out the anode front end;

e. housing means for retaining the anode, cathode holder, and injector means as an assembly;

f. first passage means for supplying the primary gas through the housing means to the injector means;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode front end; and i. cooling means for supplying cooling fluid to the cathode holder, anode, and housing means, wherein the housing means comprises:

i. a generally tubular front housing having a longitudinal axis;

ii. a generally tubular rear housing having a longitudinal axis coaxial with the longitudinal axis of the front housing; and iii. a generally tubular center housing interposed witch a tight seal between the front and rear housings and having a longitudinal axis coaxial with the longitudinal axes of the front and rear housings, the center housing including a portion of the first passage means, the center housing being made of a glass fiber reinforced TORLON material that is dimensionally stable when the plasma arc spray gun is in operation, so that the center housing maintains the tight seal witch the front and rear housings during operation of the plasma arc spray gun to prevent primary gas from leaking from the first passage means into the anode interior.

7. A subsonic plasma arc spray gun comprising:

a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back end, the front and middle interior sections having respective cylindrical inner surfaces coaxial with the longitudinal axis and the second, fourth, and back interior sections having respective frusto-conical inner surfaces coaxial with the longitudinal axis, wherein the inner diameter of the anode middle interior section is between approximately 1.5 and 2.5 times larger than the inner diameter of the anode first interior section;

b. a cathode holder having a longitudinal axis coaxial with the anode longitudinal axis;

c. a cathode assembly held in the cathode holder, the cathode assembly including a tip having an end located within the anode middle interior section;

d. injector means interposed between the cathode holder and the back end of the anode for introducing a primary gas to flow into the anode interior from the back end thereof and out the anode front end;

e. housing means for retaining the anode, cathode holder, and injector means as an assembly;

f. first passage means for supplying the primary gas through the housing means to the injector means;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode front end; and i. cooling means for supplying cooling fluid to the cathode holder, anode, and housing means.

8. A subsonic plasma arc spray gun wherein:

a. a generally tubular anode having a longitudinal axis, an exterior surface, an interior, and front and back ends, the anode interior being formed with a front section adjacent the anode front end, a second section adjacent the front section, a middle section adjacent the second section, a fourth section adjacent the middle section, and a back section adjacent the anode back end, the front and middle interior sections having respective cylindrical inner surfaces coaxial with the longitudinal axis and the second, fourth, and back interior sections having respective frusto-conical inner surfaces coaxial with the longitudinal axis;

b. a cathode holder having a longitudinal axis coaxial with the anode longitudinal axis;

c. a cathode assembly held in the cathode holder, the cathode assembly including a tip having an end located within the anode middle interior section, wherein:

i. the cathode assembly tip has a cylindrical surface having a predetermined outer diameter; and ii. the diameter of the inner surface of the anode middle interior section is between approximately 1.5 and 2.5 times larger than the outer diameter of the cathode assembly tip;

d. injector means interposed between the cathode holder and the back end of the anode for introducing a primary gas to flow into the anode interior from the back end thereof and out the anode front end;

e. housing means for retaining the anode, cathode holder, and injector means as an assembly;

f. first passage means for supplying the primary gas through the housing means to the injector means;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode front end; and i. cooling means for supplying cooling fluid to the cathode holder, anode, and housing means.

9. An article of manufacture useful in a subsonic plasma arc spray gun comprising a tubular anode having front and back ends, an exterior surface, an interior, and a longitudinal axis, the anode interior being fabricated with front, second, middle, fourth, and back sections, the front and middle interior sections having respective cylindrical inner surfaces, and the second, fourth, and back interior sections having respective frusto-conical inner surfaces, wherein:

a. the article has a total longitudinal length between the front and back ends thereof along the longitudinal axis;

b. the front interior section has a longitudinal length along the article longitudinal axis of between approximately 15 percent and 25 percent of the total article length;

c. the second interior section has a longitudinal length along the article longitudinal axis of between approximately 5 percent and 10 percent of the total article length;

d. the middle interior section has a longitudinal length along the article longitudinal axis of between approximately 35 percent and 45 percent of the total article length;

e. the fourth interior section has a longitudinal length along the article longitudinal axis of between approximately 5 percent and 10 percent of the total article length; and f. the back interior section has a longitudinal length along the article longitudinal axis of between approximately 25 percent and 35 percent of the total article length.

10. An article of manufacture useful in a subsonic plasma arc spray gun comprising a tubular anode having front and back ends, an exterior surface, an interior, and a longitudinal axis, the anode interior being fabricated with front, second, middle, fourth, and back sections, the front and middle interior sections having respective cylindrical inner surfaces, and the second, fourth, and back interior sections having respective frusto-conical inner surfaces, wherein:

a. the frusto-conical inner surface of the article back interior section has a first included angle;

b. the frusto-conical inner surface of the article fourth interior section has a second included angle that is between approximately two and three times larger than the first included angle; and c. the frusto-conical inner surface of the article second interior section has a third included angle that is between approximately two and four times larger than the second included angle.

11. An article of manufacture useful in a subsonic plasma arc spray gun comprising a tubular anode having front and back ends, an exterior surface, an interior, and a longitudinal axis, the anode interior being fabricated with front, second, middle, fourth, and back sections, the front and middle interior sections having respective cylindrical inner surfaces, and the second, fourth, and back interior sections having respective frusto-conical inner surfaces, wherein:

a. the article has an overall length along the longitudinal axis thereof of approximately 2.06 inches;

b. the article front interior section has a longitudinal length along the article longitudinal axis of approximately 0.41 inches;

c. the article second interior section has a longitudinal length along the article longitudinal axis of approximately 0.13 inches;

d. the article middle interior section has a longitudinal length along the article longitudinal axis of approximately 0.77 inches;

e. the article fourth interior section has a longitudinal length along the article longitudinal axis of approximately 0.18 inches;

f. the article back interior section has a longitudinal length along the article longitudinal axis of approximately 0.56 inches;

g. the frusto-conical inner surface of the second interior section has an included angle of approximately 90 degrees;

h. the frusto-conical inner surface of the fourth interior section has an included angle of approximately 30 degrees; and i. the frusto-conical inner surface of the back interior section has an included angle of approximately 12 degrees.

12. An article of manufacture useful in a subsonic plasma arc spray gun comprising a tubular anode having front and back ends, an exterior surfacer an interior, and a longitudinal axis, the anode interior being fabricated with front, second, middle, fourth, and back sections, the front and middle interior sections having respective cylindrical inner surfaces, and the second, fourth, and back interior sections having respective frusto-conical inner surfaces, wherein the inner diameter of the middle interior section is between approximately 1.5 and 2.5 times larger than the inner diameter of the first interior section.

13. A high velocity subsonic plasma arc spray gun comprising:

a. a generally tubular anode having a longitudinal axis, an exterior surface, an interior, and front and back ends, the anode interior defining a front section adjacent the anode front end, a back section adjacent the anode back end, and a middle section located between the front and back interior sections, the front and back interior sections having respective cylindrical inner surfaces, the middle interior section having a frusto-conical interior surface;

b. a cathode holder having a longitudinal axis coaxial with the anode longitudinal axis;

c. a cathode assembly including a fitting section and a tip, the tip having an end located within the anode middle interior section, the tip cooperating with the anode back interior section to form a first annular space;

d. an injector ring interposed between the cathode holder and the back end of the anode, the injector ring having an inner diameter that cooperates with the cathode assembly fitting section to form a second annular space coaxial with the first annular space;

e. housing means for retaining the anode, cathode holder, and injector means as an assembly;

f. first passage means for supplying a primary gas through the housing means and through the injector ring to the second annular space for flowing therethrough to the first annular space and to the anode front interior section;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode interior; and i. cooling means for supplying cooling fluid to the cathode holder, anode, and housing means.

14. The plasma arc spray gun of claim 13 wherein the housing means comprises:

a. a generally tubular front housing having a longitudinal axis;

b. a generally tubular rear housing having a longitudinal axis coaxial with the longitudinal axis of the front housing; and c. a generally tubular center housing interposed with a tight seal between the front and rear housings and having a longitudinal axis coaxial with the longitudinal axes of the front and rear housings, the center housing defining a portion of the first passage means, the center housing being made of a glass fiber reinforced TORLON material that is dimensionally stable when the plasma arc spray gun is in operation, so that the center housing maintains the tight seal with the front and rear housings during operation of the plasma arc spray gun to prevent primary gas from leaking from the first passage means into the anode interior.

15. The plasma arc spray gun of claim 13 wherein the inner diameter of the anode back interior section is between approximately 1.5 and three times larger than the inner diameter of the anode front interior section.

16. The high velocity subsonic, plasma arc spray gun of claim 14 wherein:

a. the cathode assembly comprises a fitting section having a front end and a generally cylindrical first surface having a predetermined outer diameter and flats on a portion thereof, and a frusto-conical surface concentric with the first surface and extending between the flats and the front end;

b. the tip has a cylindrical surface; and c. the frusto-conical surface intersects the tip cylindrical surface in a circular line, so that the cathode assembly fitting section and the tip cooperate to form a streamlined surface that enables the primary gas to flow within the first and second annular spaces in a laminar manner.

17. The high velocity subsonic plasma arc spray gun of claim 14 wherein the first and second annular spaces cooperate to form a streamlined passage for the primary gas to flow with laminar flow from the first passage means to the anode front interior section, and wherein the streamlined passage is defined by a stepless first surface comprising the inner diameter of the injector ring and the inner diameter of the anode back interior section and by a streamlined second surface comprising a frusto-conical surface interposed between and intersecting pair of cylindrical outer surfaces on the cathode assembly.

18. A high velocity subsonic plasma arc spray gun comprising:

a. a generally tubular anode having a longitudinal axis, an exterior surface, an interior, and front and back ends, the anode interior defining a front section adjacent the anode front end, a back section adjacent the anode back end, and a middle section located between the front and back interior sections, the front and back interior sections having respective cylindrical inner surfaces, the middle interior section having a frusto-conical inner surface;

b. a cathode holder having a longitudinal axis coaxial with the anode longitudinal axis;

c. a cathode assembly including a fitting section and a tip, the tip having an end located within the anode middle interior section, the tip cooperating with the anode back interior section to form a first annular space;

d. an injector ring interposed between the cathode holder and the back end of the anode, the injector ring having an inner diameter that cooperates with the cathode assembly fitting section to form a second annular space coaxial with the first annular space;

e. housing means for retaining the anode, cathode holder, and injector means as an assembly;

f. first passage means for supplying a primary gas through the housing means and through the injector ring to the second annular space for flowing therethrough to the first annular space and to the anode front interior section;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode interior; and i. cooling means for supplying cooling fluid to the cathode holder, anode, and housing means, wherein:

i. the inner surface of the anode front interior section intersects the inner surface of the anode middle interior section at a first circular line;

ii. the inner surface of the anode middle interior section intersects the inner surface of the anode back interior section in a second circular line;

iii. the end of the cathode assembly tip is located between approximately 85 percent and 95 percent of the distance from the second circular line to the first circular line;

iv. the anode front section has a longitudinal length along the anode longitudinal axis between the anode front and back ends of between approximately 35 percent and 45 percent of the total anode length between the front and back ends;

v. the anode middle interior section has a longitudinal length along the anode longitudinal axis between the anode front and back ends of between approximately 20 percent and 30 percent of the total anode length between the front and back ends thereof; and vi. the anode back interior section has a longitudinal length along the anode longitudinal axis between the anode front and back ends of between approximately 30 percent and 40 percent of the total anode length between the front and back ends thereof.

19. A high velocity subsonic plasma arc spray gun comprising:

a. a generally tubular anode having a longitudinal axis, an exterior surface, an interior, and front and back ends, the anode interior defining a front section adjacent the anode front end, a back section adjacent the anode back end, and a middle section located between the front and back interior sections, the front and back interior sections having respective cylindrical inner surfaces, the middle interior section having a frusto-conical inner surface, wherein:
   i. the anode has a total longitudinal length along the longitudinal axis thereof between the front and back ends thereof of approximately 2.06 inches;
   ii. the anode front interior section has a longitudinal length along the longitudinal axis thereof of approximately 0.83 inches;
   iii. the anode middle interior section has a longitudinal length along the anode longitudinal axis of approximately 0.52 inches;
   iv. the anode back interior section has a longitudinal length along the anode longitudinal axis of approximately 0.71 inches; and
   v. the frusto-conical inner surface of the anode middle interior section has an included angle of approximately 40 degrees;

b. a cathode holder having a longitudinal axis coaxial with the anode longitudinal axis;

c. a cathode assembly including a fitting section and a tip, the tip having an end located within the anode middle interior section, the tip cooperating with the anode back interior section to form a first annular space;

d. an injector ring interposed between the cathode holder and the back end of the anode, the injector ring having an inner diameter that cooperates with the cathode assembly fitting section to form a second annular space coaxial with the first annular space;

e. housing means for retaining the anode, cathode holder, and injector means as an assembly;

f. first passage means for supplying a primary gas through the housing means and through the injector ring to the second annular space for flowing therethrough to the first annular space and to the anode front interior section;

g. first fitting means for supplying electrical power to the anode and the cathode assembly to create an arc therebetween in the anode interior to heat the primary gas flowing in the anode interior into a plasma stream;

h. second passage means for supplying a coating powder to the anode interior whereat the coating powder is entrained in the plasma stream and accelerated thereby out the anode interior; and i. cooling means for supplying cooling fluid to the cathode holder, anode, and housing means.

20. An article of manufacture for use as an anode in a high velocity subsonic plasma arc spray gun comprising a tubular anode having an exterior surface, an interior, and a longitudinal axis, the interior being fabricated with front, middle, and back interior sections, the front and back interior sections having respective cylindrical inner surfaces, and the middle interior section having a frusto-conical inner surface, wherein:

a. the article has a total longitudinal length along the longitudinal axis thereof;

b. the article front interior section has a longitudinal length along the article longitudinal axis of between approximately 35 percent and 45 percent of the total article length;

c. the article middle section has a longitudinal length along the article longitudinal axis of between approximately 20 percent and 30 percent of the total article length; and d. the article back interior section has a longitudinal length along the article longitudinal axis of between approximately 30 percent and 40 percent of the total article length.

21. An article of manufacture for use as an anode in a high velocity subsonic plasma arc spray gun comprising a tubular anode having an exterior surface, an interior, and a longitudinal axis, the interior being fabricated with front, middle, and back interior sections, the front and back interior sections having respective cylindrical inner surfaces, and the middle interior section having a frusto-conical inner surface, wherein:

a. the anode has a total longitudinal length along the longitudinal axis thereof between the front and back ends thereof of approximately 2.06 inches;

b. the anode front interior section has a longitudinal length along the longitudinal axis thereof of approximately 0.83 inches;

c. the anode middle interior section has a longitudinal length along the anode longitudinal axis of approximately 0.52 inches;

d. the anode back interior section has a longitudinal length along the anode longitudinal axis of approximately 0.71 inches; and e. the frusto-conical inner surface of the anode middle interior section has an included angle of approximately 40 degrees.

22. An article of manufacture for use as an anode in a high velocity subsonic plasma arc spray gun comprising a tubular anode having an exterior surface, an interior, and a longitudinal axis, the interior being fabricated with front, middle, and back interior sections, the front and back interior sections having respective cylindrical inner surfaces, and the middle interior section having a frusto-conical inner surface, wherein the inner surface of the anode back interior section has a diameter that is between approximately 1.5 and three times larger than the diameter of the inner surface of the anode front interior section.

* * * * *